United States Patent
Killea, Jr.

[15] 3,655,231
[45] Apr. 11, 1972

[54] IMPACT BUMPER
[72] Inventor: John Francis Killea, Jr., 145 Bennington Parkway, Franklin Park, N.J. 08823
[22] Filed: Mar. 30, 1970
[21] Appl. No.: 23,874

[52] U.S. Cl. .................................. 293/86, 293/83, 293/96, 293/98, 293/99
[51] Int. Cl. .................................................... B60r 19/08
[58] Field of Search ...................... 293/83, 84, 85, 86, 96, 98, 293/99, 101

[56] References Cited

UNITED STATES PATENTS

| | | | |
|---|---|---|---|
| 1,135,066 | 4/1915 | Sonnichsen | 293/86 |
| 2,094,739 | 10/1937 | Geiger | 293/85 |
| 2,873,994 | 2/1959 | Omps | 293/86 |
| 2,186,137 | 1/1940 | Halladay | 293/85 |
| 1,579,621 | 4/1926 | Kleven | 293/83 |

*Primary Examiner*—Arthur L. La Point
*Assistant Examiner*—Robert Saifer

[57] ABSTRACT

A bumper for an automotive vehicle, the bumper having self contained means for absorbing an initial shock upon impact of the vehicle against another object, the impact bumper including a bumper mounted upon hydraulic cylinders or pneumatic cylinders which permit the bumper to retract without transmitting the initial shock directly to the remainder of the vehicle.

1 Claim, 2 Drawing Figures

INVENTOR
JOHN F. KILLEA, JR.

IMPACT BUMPER

This invention relates generally to automotive vehicles. More specifically the present invention pertains to automotive vehicle bumpers.

A principal purpose of the present invention is to provide an impact bumper for an automotive which has self contained means for absorbing an initial shock upon impact with another vehicle or other object in front thereof.

Another purpose of the present invention is to provide an impact bumper which is mounted upon a plurality of impact cylinders having retractable pistons so as to absorb an initial shock caused by impact of the bumper against another object.

Still another purpose of the invention is to provide an impact bumper which is additionally secured by diagonally extending braces to the vehicle frame and which hold the ends of the bumper while a center part of the bumper moves against the impact cylinders.

Still another purpose of the present invention is to provide an impact bumper which promotes safety on the public highways so as to decrease injury and fatalities.

Other objects of the present invention are to provide an impact bumper which is simple in design, inexpensive to manufacture, rugged in construction, easy to use and efficient in operation.

Figure 1:
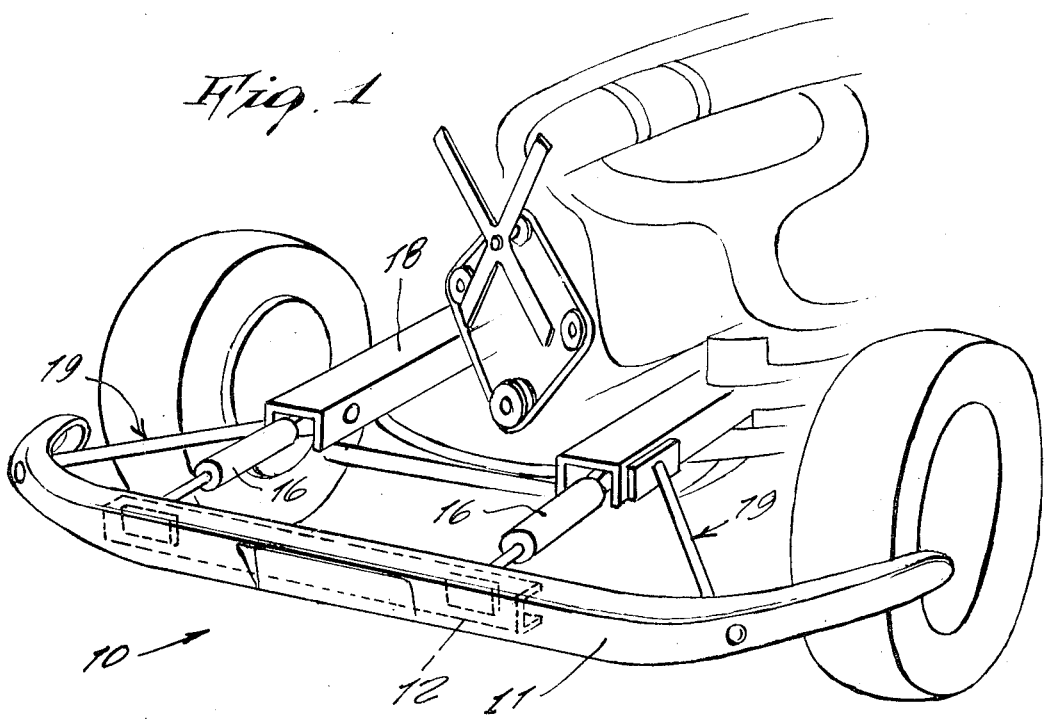
Figure 2:
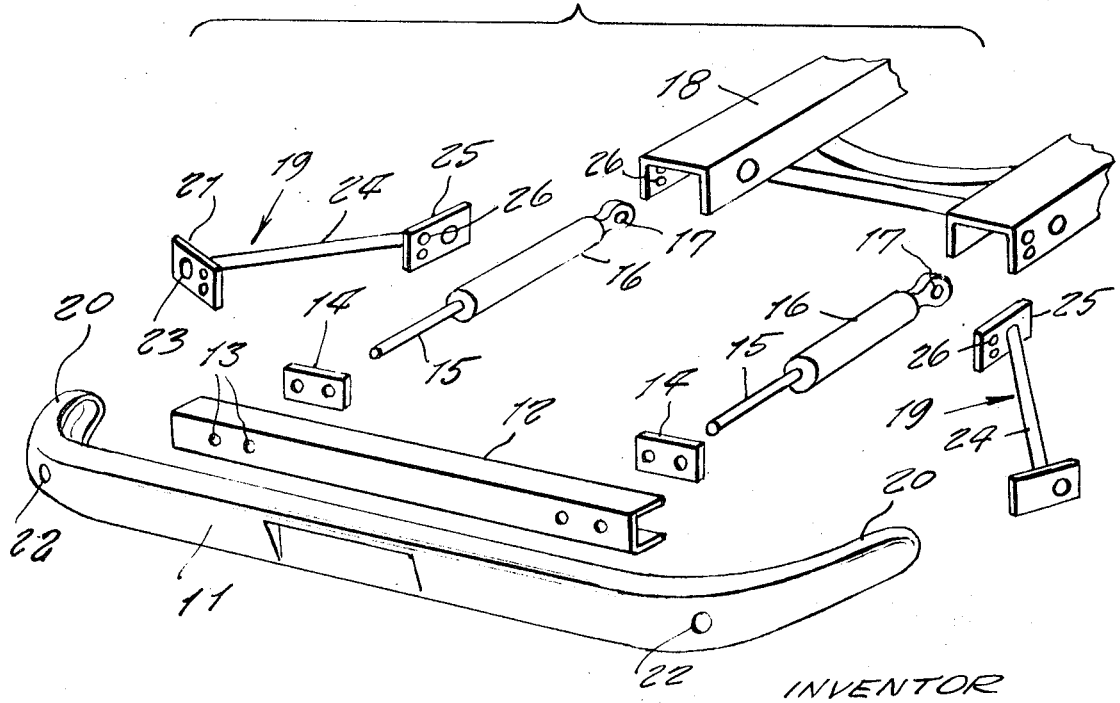

These and other objects will be readily evident upon a study of the following specification and the accompanying drawing wherein:

FIG. 1 is a perspective view of the assembly mounted on an automotive vehicle; and FIG. 2 is an exploded perspective view showing the components of the present invention.

Referring now to the drawing in detail, the reference numeral 10 represents an impact bumper according to the present invention wherein there is a front or rear bumper 11 having a stabilizer bar 12 positioned adjacent a rear side thereof. Two pairs of mounting openings 13 are provided in the stabilizer bar 12 for the purpose of securing a pair of lugs 14 thereto, each lug being securable to a forward end of a piston rod 15 of a piston contained within an impact cylinder 16. The rear end of the cylinder 16 has an opening 17 extending transversely therethrough for receiving a mounting pin securable to an automobile vehicle frame 18.

A pair of braces 19 are attachable to the ends 20 of the bumper 11, each brace 19 having a plate 21 fitted against a rear side of the bumper and secured thereto by means of a bolt 22 receivable through the bumper and through an opening 23 of the plate 21. A strong bar 24 attached at one end to the plate 21 is attached at its opposite end to a plate 25 securable by means of bolts to the automobile frame 18, the bolts being received through corresponding openings 26 of the plate 25 and the automobile frame 18.

In operative use, it is now evident that upon a violent impact against the outer side of the bumper 11, the shock will be transmitted to the impact cylinders 16 which thus absorb the initial shock to the remainder of the vehicle. It is to be noted that the cylinders accept a shock imparted upon the central portion of the bumper which thus is deflected inwardly upon impact, while the opposite ends of the bumper are maintained rigid by means of the diagonally extending braces 19 which serve to prevent a complete collapse of the bumper, thus preventing complete or more extensive damage to a forward portion of the vehicle.

Thus there is provided a device which will save human lives and lessen injury to others.

What I now claim is:

1. In an automotive vehicle incorporating an impact bumper, the combination of an automotive vehicle having a bumper on the end thereof, said automotive vehicle including a vehicle frame, said vehicle frame retractably supporting a portion of said bumper so as to absorb an initial shock upon impact to said bumper with another object, a stabilizer bar mounted adjacent a rear side of said bumper, a pair of lugs secured near opposite ends of said stabilized bar, said lugs mounted on forward ends of a pair of piston rods of pistons contained within a pair of impact cylinders, a rear end of each said cylinder having a transverse mounting opening for receiving a mounting bolt secured to a forward end of said vehicle frame, a pair of diagonally extending braces secured at their forward end to the opposite ends of said bumper, a rear end of said braces secured directly to a stationary, non-flexing channel forming a component of said vehicle frame, each said brace including a forward mounting plate secureable to a rear side of said bumper ends, and a rear plate secureable to a forward end of said vehicle frame.

* * * * *